US012809047B2

(12) United States Patent
Huang et al.

(10) Patent No.: US 12,809,047 B2
(45) Date of Patent: Nov. 24, 2026

(54) SPATIOTEMPORAL AND SPECTRAL CLASSIFICATION OF ACOUSTIC SIGNALS FOR VEHICLE EVENT DETECTION

(71) Applicant: NEC Laboratories America, Inc., Princeton, NJ (US)

(72) Inventors: Ming-Fang Huang, Princeton, NJ (US); Milad Salemi, Cross River, NY (US)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 18/417,812

(22) Filed: Jan. 19, 2024

(65) Prior Publication Data

US 2024/0248228 A1 Jul. 25, 2024

Related U.S. Application Data

(60) Provisional application No. 63/480,553, filed on Jan. 19, 2023.

(51) Int. Cl.
*G01V 1/30* (2006.01)
*G01V 1/22* (2006.01)
*G01V 1/28* (2006.01)

(52) U.S. Cl.
CPC .............. *G01V 1/307* (2013.01); *G01V 1/226* (2013.01); *G01V 1/288* (2013.01); *G01V 2210/43* (2013.01); *G01V 2210/65* (2013.01); *G01V 2210/72* (2013.01)

(58) Field of Classification Search
None
See application file for complete search history.

(56) References Cited

U.S. PATENT DOCUMENTS

2021/0314681 A1* 10/2021 Huang ............... H04Q 11/0062
2022/0065690 A1 3/2022 Han et al.
2022/0196462 A1 6/2022 Han et al.
2022/0381607 A1 12/2022 Han et al.
2024/0302229 A1* 9/2024 Lindsey ............. G01D 5/35361

* cited by examiner

*Primary Examiner* — Raymond L Nimox
(74) *Attorney, Agent, or Firm* — Vincent Duffy

(57) ABSTRACT

Disclosed are systems and methods that estimate machine distance to an optical fiber cable from sensing data collected using distributed fiber optic sensing (DFOS). Specialized hardware, DFOS that uses optical sensor fiber as a continuous spatial sensor along with a real time Artificial Intelligence (AI) processing unit, that detects threats within a proximity of buried fiber optic cable and a determines a moving direction of the threats such that it can effectively mitigate and contain the threats before damage to the buried fiber optic cable occurs. Advantageously, the system according to the present disclosure does not require any prior location knowledge or surveying prior to performing its monitoring.

4 Claims, 9 Drawing Sheets

SPATIOTEMPORAL AND SPECTRAL CLASSIFICATION OF ACOUSTIC SIGNALS FOR VEHICLE EVENT DETECTION

CROSS-REFERENCE TO RELATED APPLICATIONS

This application claims the benefit of U.S. Provisional Patent Application Ser. No. 63/480,553 filed Jan. 19, 2023, the entire contents of which is incorporated by reference as if set forth at length herein.

FIELD OF THE INVENTION

This application relates generally to distributed fiber optic sensing (DFOS) systems, methods, structures, and related technologies. More particularly, it pertains to the determination of machine moving direction for cable cut prevention based on vibration proximity monitoring system (VPMS).

BACKGROUND OF THE INVENTION

Optical fiber infrastructure is the foundation of modern telecommunications networks. Reliability of optical fiber in telecommunications networks is crucial to network operators for the services they provide as well as their customers. One challenge of operators is to protect cables against potential catastrophic damages due to construction and other operations. As is known, damage to optical fiber networks may result from a lack of accurate positioning surveys, or no surveying information due to the age of optical fiber cable deployment.

Damage to the optical fiber cables result in service interruption costly repairs. Accordingly, preventing an optical fiber cable cut is of paramount importance to telecommunications service providers. In those situations where excavation or other machinery is operating in the vicinity of an optical fiber cable, it would be most desirable for the service provider to become aware of such machinery threats to the optical fiber cable before a cut occurs.

SUMMARY OF THE INVENTION

An advance in the art is made according to aspects of the present disclosure directed to systems, methods, and structures that estimate machine distance to an optical fiber cable from sensing data collected using distributed fiber optic sensing (DFOS).

An illustrative example of sensing operation of a DFOS might include detecting a construction machine operating between 140 m and 170 m perpendicular to an optical fiber cable. Machine generated vibration signals are detected by the DFOS at—for example—17,820 to 18,300 meters as measured along the length of the optical fiber cable from a DFOS interrogator. The DFOS interprets the DFOS vibration signals and generates a visual display wherein stronger vibration signals that result from the machine being closer to the optical fiber cable are—for example—displayed in brighter colors. In this manner, an operator quickly observing the visual display may determine if the operating machinery is a threat to the optical fiber cable and take preventative action.

Our inventive system and method according to aspects of the present disclosure namely, a Vibration Proximity Monitoring System (VPMS) includes specialized hardware, DFOS that uses optical sensor fiber as a continuous spatial sensor along with a real time Artificial Intelligence (AI)

processing unit, that detects threats within a proximity of buried fiber optic cable and a determines a moving direction of the threats such that it can effectively mitigate and contain the threats before damage to the buried fiber optic cable occurs. Advantageously, the VPMS according to the present disclosure does not require any prior location knowledge or surveying prior to performing its monitoring.

In sharp contrast to the prior art, our inventive VPMs provides 24/7 continuous monitoring along an entire optical fiber cable route, supports monitoring multiple equipment operating regions, and provides real-time detection and immediate operator notification of impending threats.

In addition, VPMS may utilize existing deployed cable as sensing media for cable self-monitoring, no dedicated newly installed sensors are needed. Such cable may advantageously and simultaneously convey live telecommunications traffic in addition to monitoring. Generally, no installation or deployment of hardware is required along the cable, no visuals are required along the cable, and multiple AI analysis modes to fit various environmental and external conditions.

DETAILED DESCRIPTION OF THE INVENTION

Figure 1A:
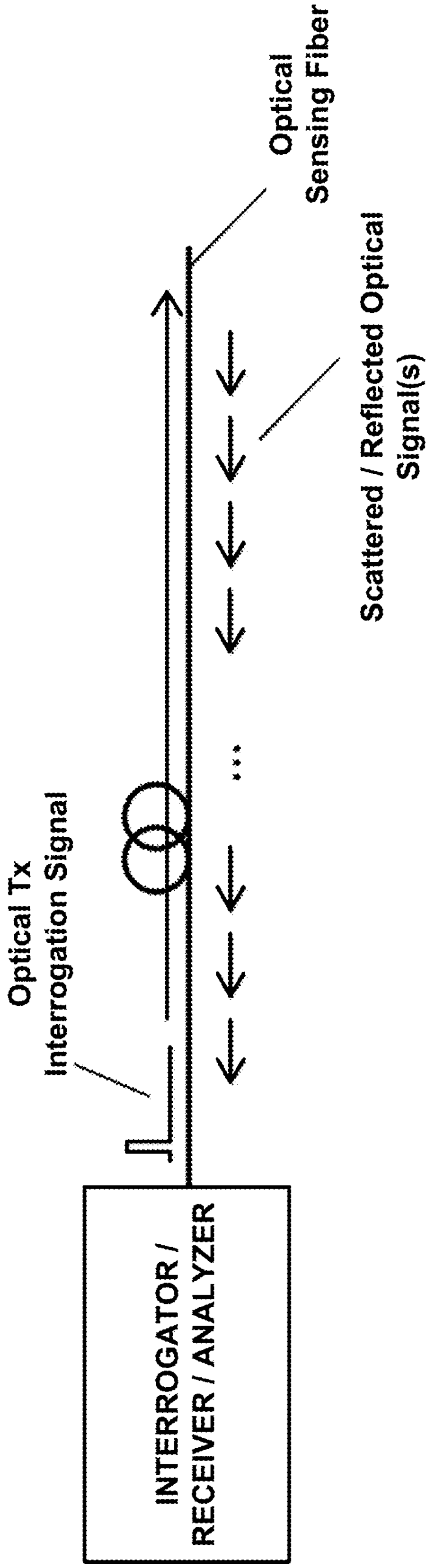
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
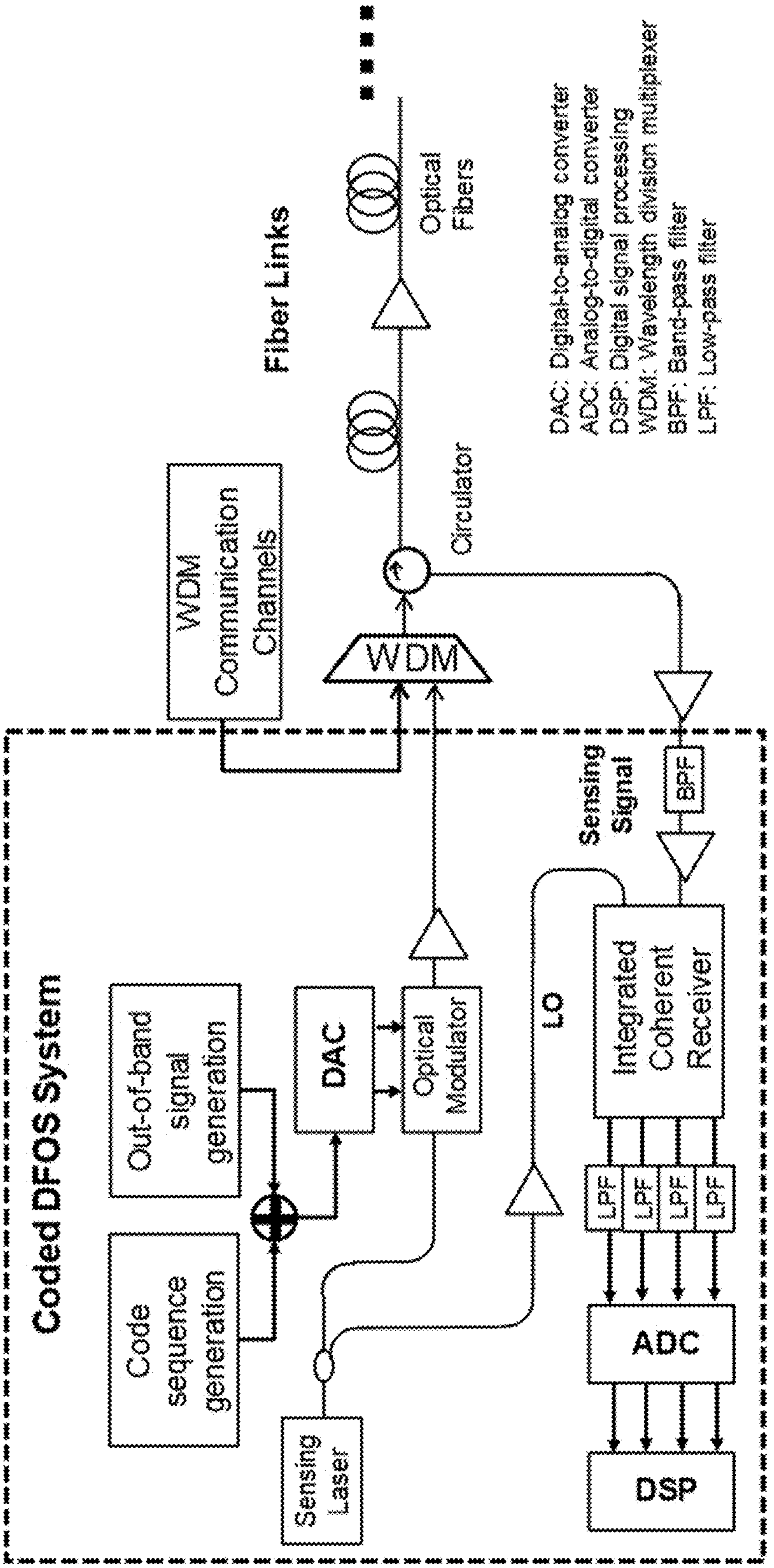

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back/forward to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

We note that this additional background is only show to introduce distributed acoustic sensing. When DAS techniques are sometimes employed, a receiver/interrogator is located at a far side of the transmitter-receiver configuration.

As we shall now further show and describe systems, methods, and structures according to aspects of the present disclosure.

Figure 2:
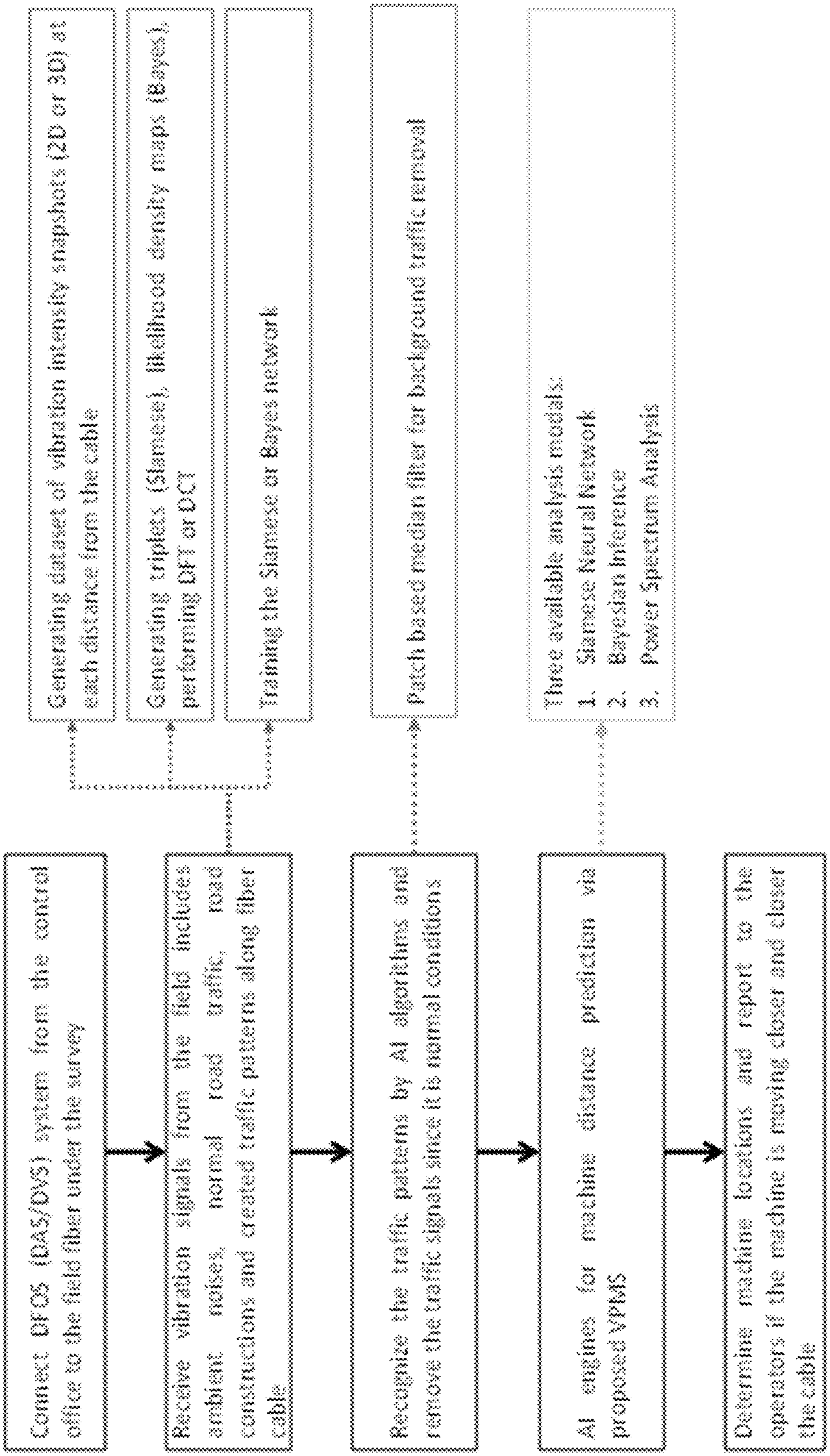
FIG. 2 is a schematic block diagram showing illustrative features and illustrative sequences of a system and method according to aspects of the present disclosure.

FIG. 2 is a schematic block diagram showing illustrative features and illustrative sequences of a system and method according to aspects of the present disclosure. As shown in that figure, a DFOS system (DAS/DVS) is connected to an optical sensor fiber that is used for a particular testing operation.

As described previously, the DFOS is operated and receives vibration signals from the optical sensor fiber deployed in the field that includes, for example, ambient noise, normal road traffic, road construction and traffic patterns that are created along the roadway and optical sensor fiber.

Traffic patterns are recognized by AI methodologies and normal traffic conditions are removed. AI engines are employed for machine distance prediction using VPMS.

Determined machine locations are reported to operators if machine(s) are moving closer to the optical sensor fiber cable according to predetermined conditions.

Figure 3:
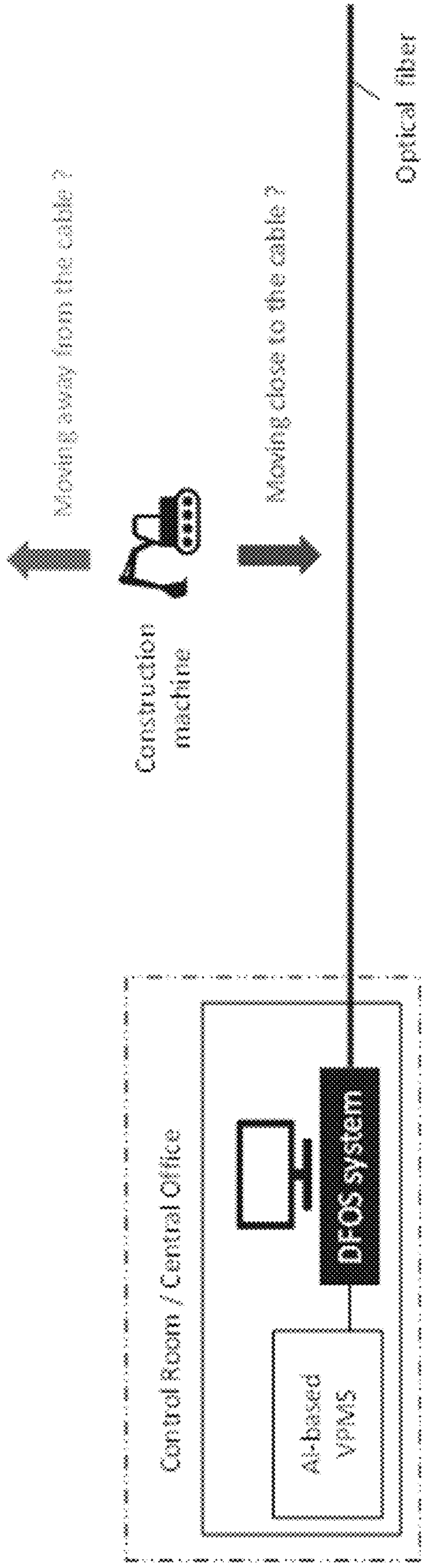
FIG. 3 is a schematic block diagram showing illustrative system configuration and setup according to aspects of the present disclosure.

FIG. 3 is a schematic block diagram showing illustrative system configuration and setup according to aspects of the present disclosure.

Simulate Moving Machine(s)

As may be observed from that figure, the sensing "layer" of the optical sensor is overlaid on testbed fiber. The DFOS can be distributed acoustic sensing (DAS) and/or distributed vibration sensing (DVS), and a controller/interrogator/analyzer may be located in a control office/central office for remote monitoring of entire cable route. Note that portions such as control/analysis etc., may be remote, i.e., in a "cloud".

As noted, the DFOS system is connected to the optical sensor fiber to provide sensing functions over a long-term and real-time. The fiber can be a dark fiber or operational fiber from service providers. In our evaluation, we focus on a machine moving directions which can be viewed as a threat to an underground fiber optic cable if the machine continues moving closer and closer to the fiber.

Obtain the Sensing Data from the DFOS

The signal received from DFOS is represented as a waterfall trace. We treat/process the data as images and extract information for further processing.

Input Data Acquisition

One part of our inventive system and methods according to aspects of the present disclosure is the analysis algorithms that process incoming data and determine moving direction of a vibration source such as construction machinery.

Figure 4:
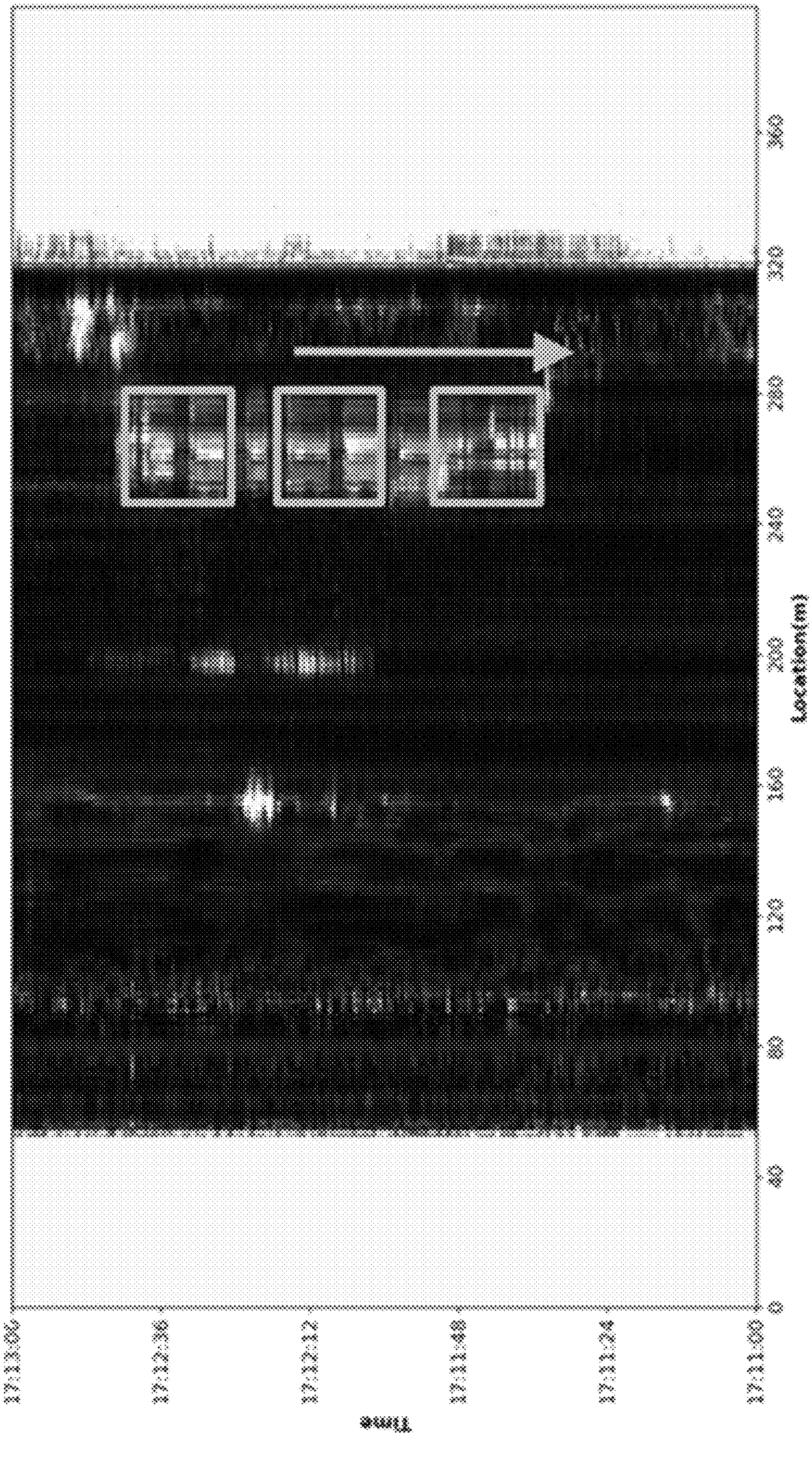
FIG. 4 is a plot showing illustrative example of waterfall sensing data according to aspects of the present disclosure.

The first general operation among all analysis algorithm procedures is input data acquisition. In an illustrative embodiment, Input data is a 2-dimensional (time×distance) vibration intensity data snapshot from waterfall (vibration intensity at each sensing point along cable over time). Sample snapshots are shown in FIG. 4, a plot showing illustrative example of waterfall sensing data according to aspects of the present disclosure.

Data Processing

The input data will be processed differently by each analysis algorithm as follows:

Siamese Neural network: In this method we have a pair-wise comparison model in a triplet setup.

A: a random snapshot from class A,

B: another snapshot from class A,

C: a snapshot from a class other than class A

Figure 5A:
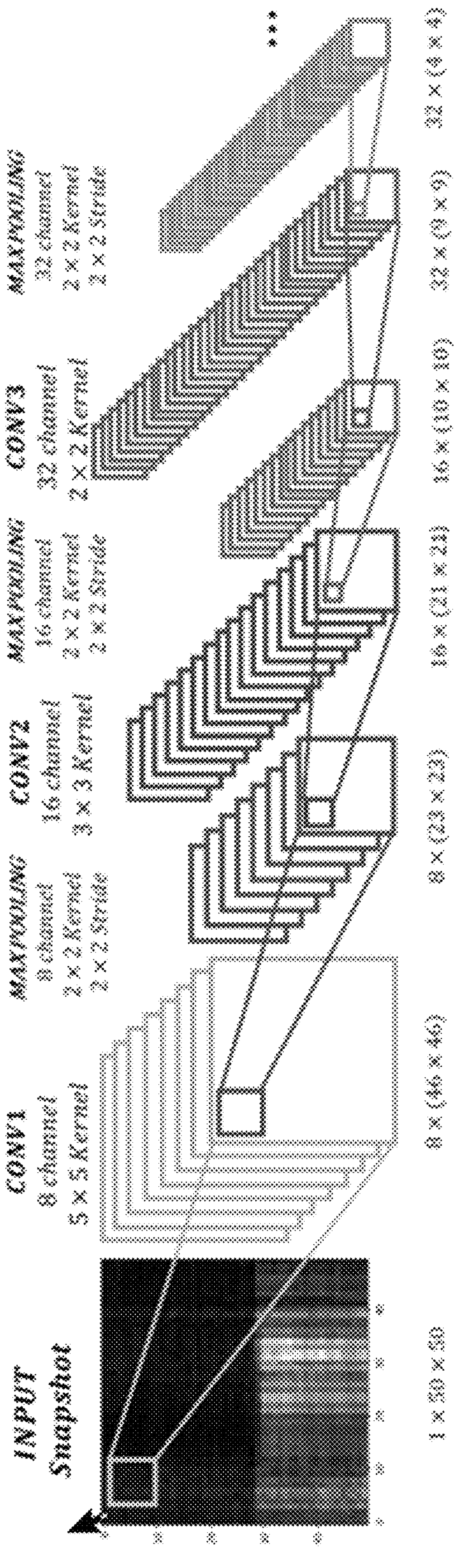
FIG. 5(A) and FIG. 5(B) show an illustrative Siamese Neural Network according to aspects of the present disclosure.
Figure 5B:
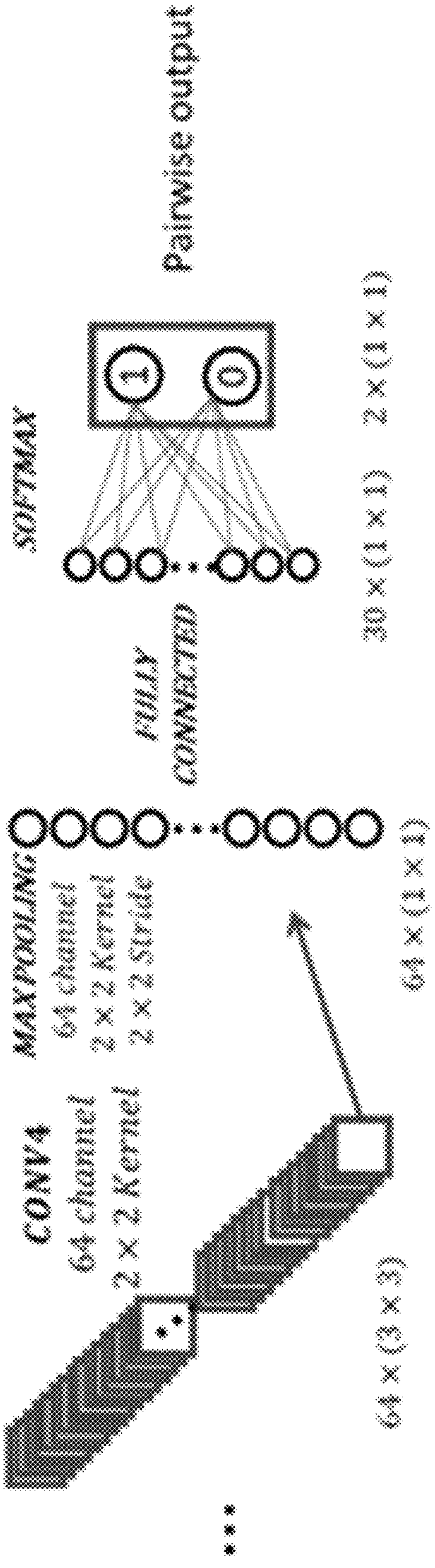

We have developed a deep learning model, specifically a 5-layer Convolutional Neural Network (CNN) that uses set up of triplets as shown in FIGS. 5(A) and 5(B). FIG. 5(A) and FIG. 5(B) show an illustrative Siamese Neural Network according to aspects of the present disclosure.

$$[A \to B: 1, A \to C: 0] = (A, B, C)$$

If B is from the same class as A then the label is 1 (or same class), else the label is 0 or other class. We evaluate various models that assess this criterion and choose the best performing one.

To put it in context, in a real time evaluation, the model compares the new snapshot with the old snapshot. If the model assess that the new snapshot is not in the same class as previous one it will raise a flag. With further analysis we can project if the machine is getting closer (approach) or going away (departure) from the cable location.

Bayesian Inference: In this method, the outcome of decision for each input snapshot when moving is detected is binary, hence a semi-binomial probability distribution function can be used to quantify probability of approach or departure to and from the buried cable. Unlike in the binomial distribution, probabilities of departure, p(I), and approach, q(I), are not constant in each trial, and instead are function of vibration intensity which itself is a nonlinear function of distance from cable.

Figure 6:
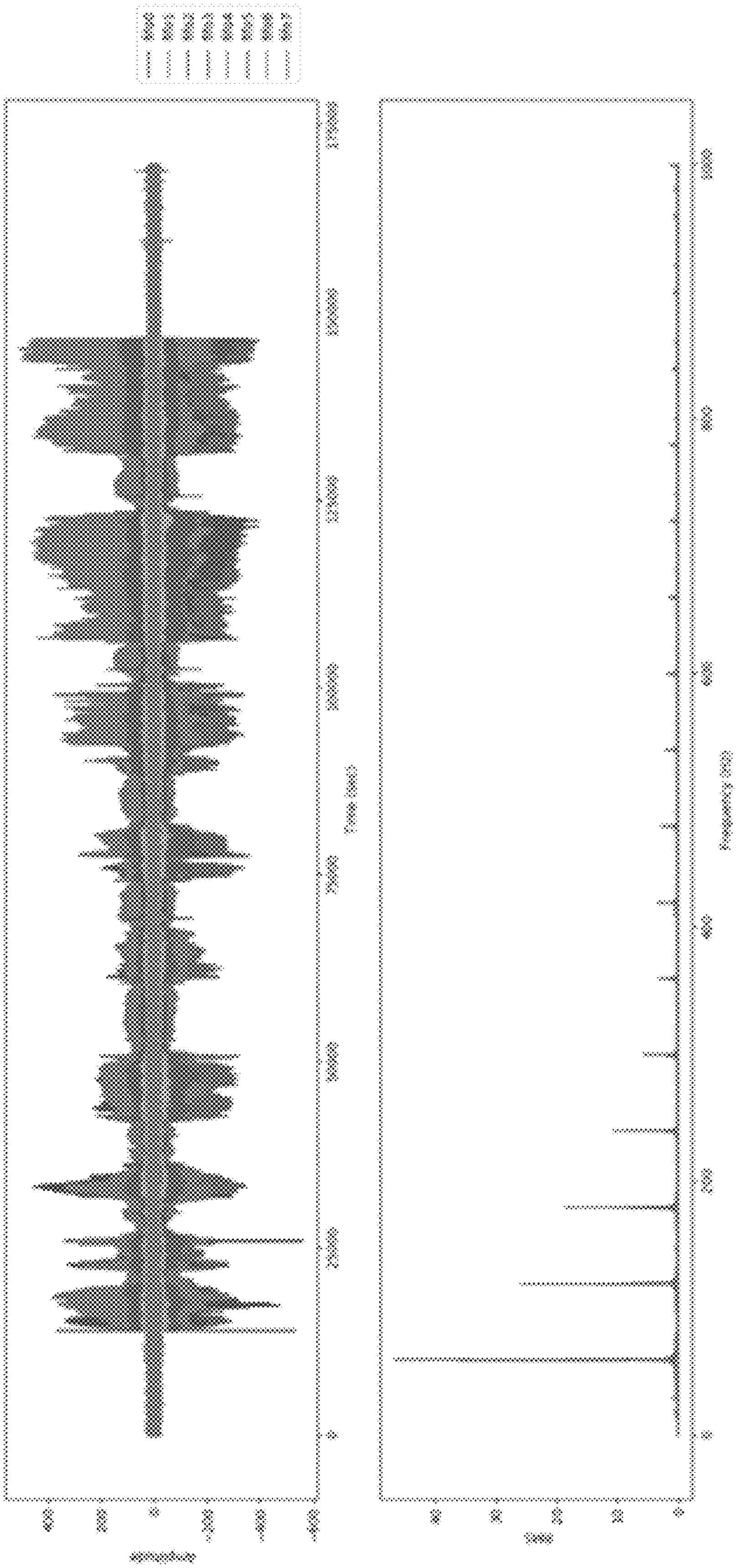
FIG. 6 shows an illustrative discrete Fourier transform (DFT) according to aspects of the present disclosure.

Power Spectrum Analysis: In this method observed 1-dimensional waveform data snapshot is used as real time analysis input instead of 2d snapshot. Waveform is decomposed using Discrete Fourier transform (DFT) and Discrete Cosine Transform (DCT). The idea is that moving direction can be detected due different energy attenuation pattern for different frequencies due to vibration at different distances from cable. A sample DFT in FIG. 6 shows 8 waveforms with their amplitudes and corresponding frequency response. The sensing point at longer distance (fifo0 and fifo7) demonstrate lower energy density for the same vibration frequency.

Figure 7:
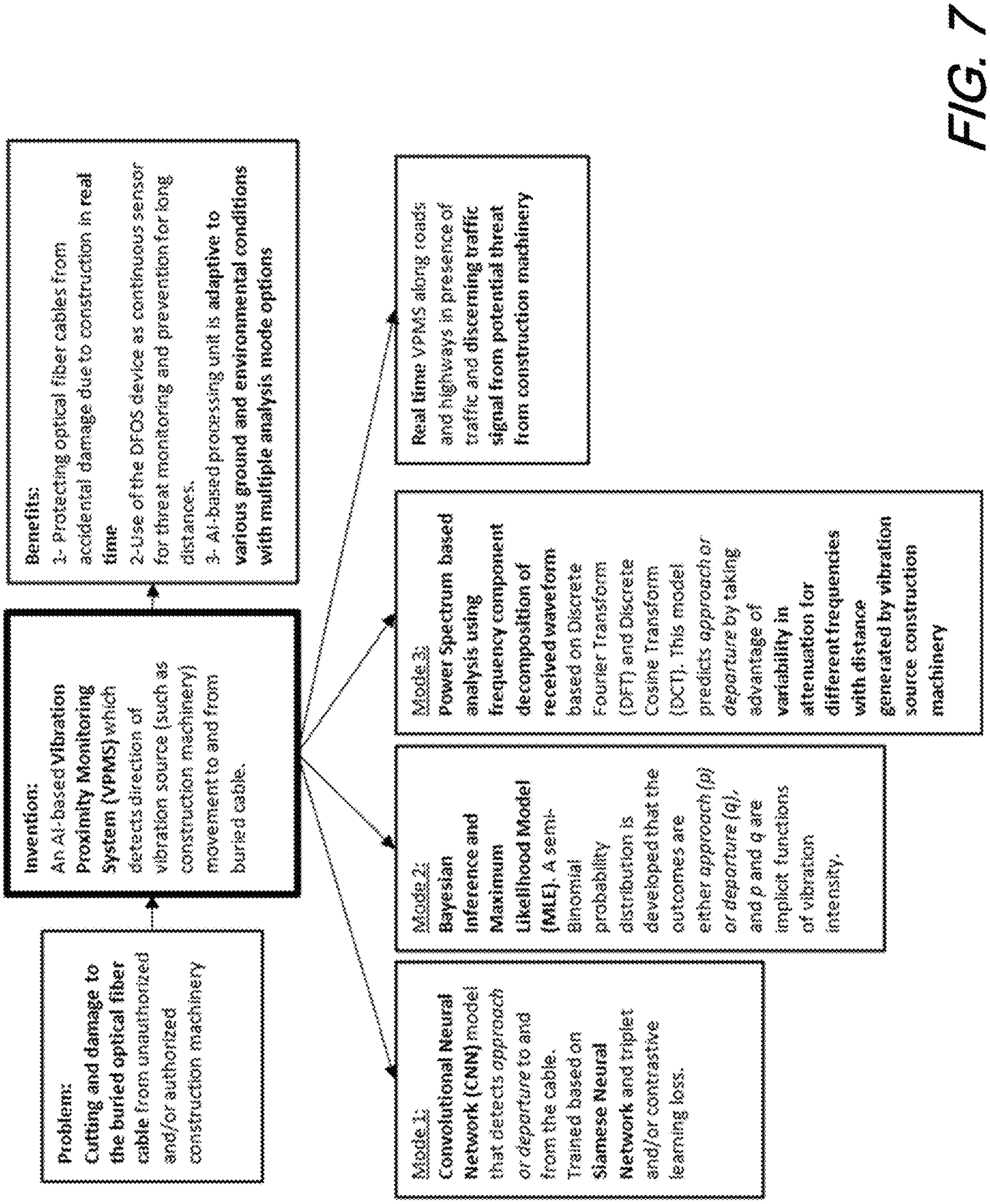
FIG. 7 is an illustrative hierarchical feature diagram of systems, and methods according to aspects of the present disclosure.

FIG. 7 is an illustrative hierarchical feature diagram of systems, and methods according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for determining machine moving direction for cable cut prevention, the method comprising:

operating a distributed fiber optic sensing system (DFOS) including a sensor fiber;

obtaining, by the DFOS, sensing data indicative of vibration generated by operation of a machine in proximity to the sensor fiber, the sensing data including DFOS waterfall data representing vibration intensity over time and distance along the sensor fiber;

generating, from the DFOS waterfall data, a plurality of time-distance vibration intensity snapshots;

determining, by a convolutional neural network (CNN), from a comparison of at least a current one of the time-distance vibration intensity snapshots with at least a previous one of the time-distance vibration intensity snapshots, whether the machine is approaching or departing from the sensor fiber;

wherein the CNN is trained based on a Siamese Neural Network (SNN) using one or more of triplet loss and contrastive loss; and in response to determining that the machine is approaching the sensor fiber, generating a cable-cut-prevention alert indicating that the machine is approaching the sensor fiber.

2. A system for determining machine moving direction for cable cut prevention, the system comprising:

a distributed fiber optic sensing system (DFOS) including a sensor fiber;

one or more processors; and one or more memories storing instructions that, when executed by the one or more processors, cause the system to:

obtain, by the DFOS, sensing data indicative of vibration generated by operation of a machine in proximity to the sensor fiber;

extract, from the sensing data, received waveforms associated with a plurality of sensing positions along the sensor fiber;

perform a power spectrum based analysis using frequency component decomposition of the received waveforms, the frequency component decomposition being based on both a Discrete Fourier Transform (DFT) and a Discrete Cosine Transform (DCT);

predict, based on the power spectrum based analysis, whether the machine is approaching or departing from the sensor fiber in consideration of variability in attenuation for different frequencies with distances generated by vibration of the machine; and in response to determining that the machine is approaching the sensor fiber, generate a cable-cut-prevention alert indicating that the machine is approaching the sensor fiber.

3. The method of claim 1, further comprising applying a patch-based median filter to the DFOS waterfall data to remove background traffic signals prior to generating the plurality of time-distance vibration intensity snapshots.

4. A method for determining machine moving direction for cable cut prevention, the method comprising:

operating a distributed fiber optic sensing system (DFOS) including a sensor fiber;

obtaining, by the DFOS, sensing data indicative of vibration generated by operation of a machine in proximity to the sensor fiber;

extracting, from the sensing data, received waveforms associated with a plurality of sensing positions along the sensor fiber;

performing a power spectrum based analysis using frequency component decomposition of the received waveforms, the frequency component decomposition being based on both a Discrete Fourier Transform (DFT) and a Discrete Cosine Transform (DCT);

predicting, based on the power spectrum based analysis, whether the machine is approaching or departing from the sensor fiber in consideration of variability in attenuation for different frequencies with distances generated by vibration of the machine; and in response to determining that the machine is approaching the sensor fiber, generating a cable-cut-prevention alert indicating that the machine is approaching the sensor fiber.

* * * * *